United States Patent
Oguro et al.

(10) Patent No.: US 8,607,726 B2
(45) Date of Patent: Dec. 17, 2013

(54) INSTRUMENT DIAL AND ITS MANUFACTURING METHOD

(75) Inventors: Yuko Oguro, Niigata (JP); Masato Obata, Niigata (JP); Yasuo Shimbo, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 462 days.

(21) Appl. No.: 12/865,638

(22) PCT Filed: Dec. 16, 2008

(86) PCT No.: PCT/JP2008/072800
§ 371 (c)(1),
(2), (4) Date: Jul. 30, 2010

(87) PCT Pub. No.: WO2009/096104
PCT Pub. Date: Aug. 6, 2009

(65) Prior Publication Data
US 2010/0326348 A1    Dec. 30, 2010

(30) Foreign Application Priority Data
Jan. 30, 2008    (JP) .................................. 2008-018540

(51) Int. Cl.
*G01D 13/04* (2006.01)
*G01D 13/02* (2006.01)

(52) U.S. Cl.
USPC ........................... 116/334; 116/298; 116/62.1

(58) Field of Classification Search
USPC ........... 116/298, 334, 335, 62.1; 101/35, 491; 427/258, 261, 265; 428/32.24
See application file for complete search history.

(56) References Cited

U.S. PATENT DOCUMENTS

| | | | | |
|---|---|---|---|---|
| 293,170 | A | * | 2/1884 | Hart .............................. 368/232 |
| 5,893,322 | A | * | 4/1999 | Schneider et al. .............. 101/34 |
| 6,938,551 | B2 | * | 9/2005 | Inoue et al. .................... 101/491 |
| 2004/0228986 | A1 | * | 11/2004 | Miyanishi et al. ........... 428/32.1 |
| 2005/0036220 | A1 | | 2/2005 | Miyanishi et al. |
| 2005/0129879 | A1 | * | 6/2005 | Bodis ........................ 428/32.24 |
| 2005/0196542 | A1 | * | 9/2005 | Cooper ......................... 427/402 |
| 2006/0159852 | A1 | * | 7/2006 | Schultheis .................... 427/258 |
| 2007/0064322 | A1 | | 3/2007 | Migitaka et al. |
| 2007/0071917 | A1 | | 3/2007 | Migitaka et al. |
| 2008/0299315 | A1 | * | 12/2008 | Iwase et al. ................... 427/265 |

FOREIGN PATENT DOCUMENTS

| | | |
|---|---|---|
| JP | 06-055958 | 3/1994 |
| JP | 2002-361833 | 12/2002 |
| JP | 2005-031634 | 2/2005 |

* cited by examiner

*Primary Examiner* — Richard A Smith
(74) *Attorney, Agent, or Firm* — McDermott Will & Emery LLP

(57) ABSTRACT

[Problem] To provide an instrument dial and its manufacturing method wherein it is possible to shorten a print time and achieve a reduction in cost.
[Means for Resolution] An instrument dial with index portions 5 provided in background portions 3 and 4 by subjecting a substrate 1 to printing includes an underlying portion 2 configured of a screen print layer provided on the substrate 1; a first background portion 3 which, being configured of a screen print layer formed on the underlying portion 2, does not include the index portions 5; and second background portions 4 which are configured of a digital print layer formed on the underlying portion 2 and, as well as including the index portions 5, are continuous with the first background portion 3.

2 Claims, 3 Drawing Sheets

INSTRUMENT DIAL AND ITS MANUFACTURING METHOD

RELATED APPLICATIONS

This application is the U.S. National Phase under 35 U.S.C. §371 of International Application No. PCT/JP2008/072800, filed on Dec. 16, 2008, which in turn claims the benefit of Japanese Application No. 2008-018540, filed on Jan. 30, 2008, the disclosures of which Applications are incorporated by reference herein.

TECHNICAL FIELD

The present invention relates to an instrument dial, and particularly, to an instrument dial which is suitable as a vehicle instrument dial, and its manufacturing method.

BACKGROUND ART

With this kind of instrument dial, normally, it is common that index portions and background portions are provided on a surface of a substrate made of, for example, a translucent synthetic resin by a screen printing, and an instrument dial is known which is of a type such that the background portions are formed with an opaque ink, and the index portions are formed with a translucent ink, and transmissively illuminated by a backlight (for example, refer to a patent document to be described hereafter).
[Patent Document 1] JP-A-2005-31634

DISCLOSURE OF THE INVENTION

Problems that the Invention is to Solve

However, in the case of manufacturing an instrument dial by means of a screen printing, as the instrument dial varies a great deal depending on a type of vehicle, an engine displacement, a grade, a destination, and the like, as well as this also resulting in various kinds of instrument dial, the print details thereof differ from one another. For this reason, a fabrication technique using a screen printing has a problem in that there are many setup steps, such as a block replacement, an ink replacement, and the like, making a manufacturing process cumbersome and complicated, and eventually leading to an increase in cost.

The invention, bearing in mind the heretofore described problem, has an object of providing an instrument dial and its manufacturing method wherein it is possible to shorten a print time, and achieve a reduction in cost.

Means for Solving the Problems

The invention, in order to solve the heretofore described problem, is an instrument dial with index portions provided in background portions by subjecting a substrate to printing, characterized by including a first background portion which, being configured of a screen print layer formed on the substrate, does not include the index portions; and second background portions which are configured of a digital print layer formed on the substrate and, as well as including the index portions, are continuous with the first background portion.

Also, the invention, in order to solve the heretofore described problem, is an instrument dial with index portions provided in background portions by subjecting a substrate to printing, characterized by including an underlying portion configured of a screen print layer provided on the substrate; a first background portion which, being configured of a screen print layer formed on the underlying portion, does not include the index portions; and second background portions which are configured of a digital print layer formed on the underlying portion and, as well as including the index portions, are continuous with the first background portion.

Also, the invention is characterized in that the underlying portion is formed on the substrate so as to have a wider range than the first background portion and second background portions, the first background portion has non-formation regions through which the underlying portion is exposed in shapes corresponding to the second background portions, and the second background portions are provided on portions of the underlying portion positioned in the non-formation regions.

Also, the invention is characterized in that the digital print layer is configured of an ultraviolet cure ink-jet print layer.

Also, the invention, in order to solve the heretofore described problem, is a method of manufacturing an instrument dial with index portions designed on background portions by subjecting a substrate to printing, characterized by including a screen printing step which forms on the substrate a first background portion which does not include the index portions; and a digital printing step which forms, on the substrate, second background portions which, as well as including the index portions, are continuous with the first background portion.

Also, the invention, in order to solve the heretofore described problem, is a method of manufacturing an instrument dial with index portions provided in background portions by subjecting a substrate to printing, characterized by including a first screen printing step which forms an underlying portion on the substrate; a second screen printing step which forms on the underlying portion a first background portion which does not include the index portions; and a digital printing step which forms, on the underlying portion, second background portions which, as well as including the index portions, are continuous with the first background portion.

Also, the invention is characterized in that the underlying portion is formed so as to have a wider range than the first background portion and second background portions, and the first background portion is formed in such a way as to have non-formation regions through which the underlying portion is exposed in shapes corresponding to the second background portions, and the second background portions are provided in such a way as to cover the underlying portion positioned in the non-formation regions.

Advantage of the Invention

According to the invention, it is possible to provide the instrument dial and its manufacturing method to achieve the initial object to shorten the print time and to achieve the reduction in cost.

DESCRIPTION OF REFERENCE NUMERALS AND SIGNS

Figure 1:
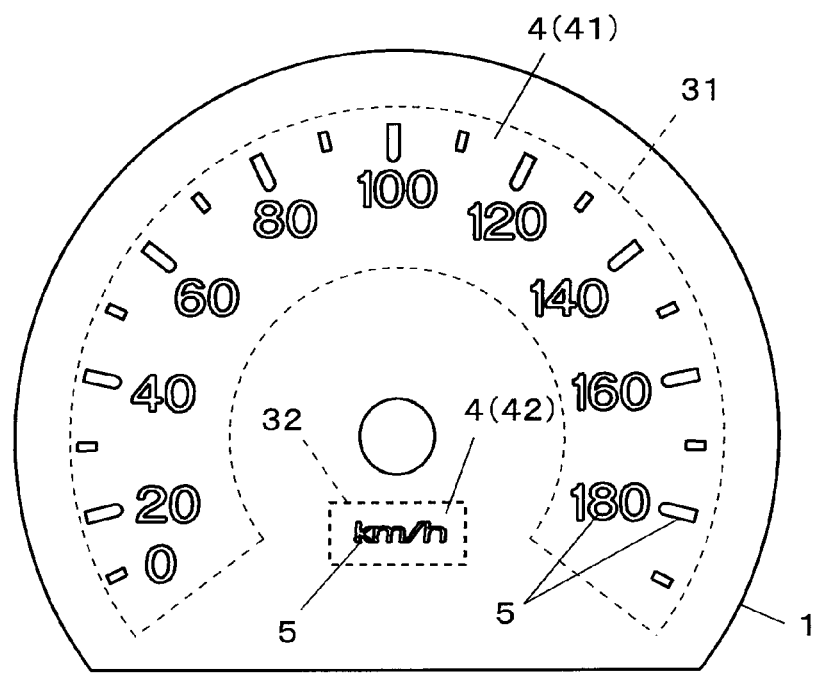
FIG. 1 is a sectional view of an instrument dial according to one embodiment of the invention.

1 Substrate
2 Underlying portion
3 First background portion
4 Second background portions
5 Index portions
31 First non-formation region
32 Second non-formation region
41 First background region
42 Second background region

BEST MODE FOR CARRYING OUT THE INVENTION

Hereafter, a description will be given, using the accompanying drawings, of an embodiment of the invention.

Figure 2:
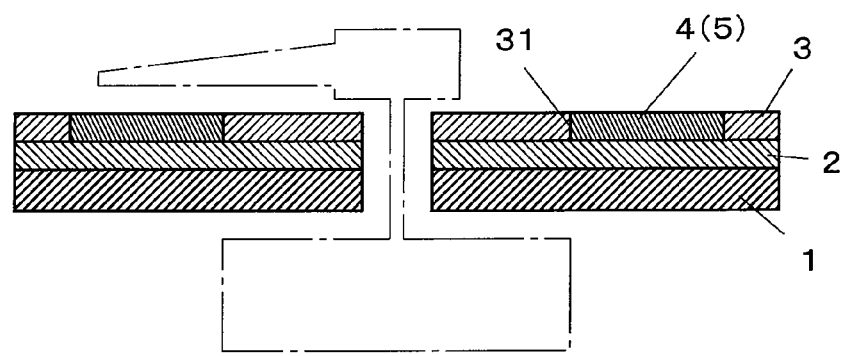
FIG. 2 is a front view of the instrument dial according to the embodiment.
Figure 3:
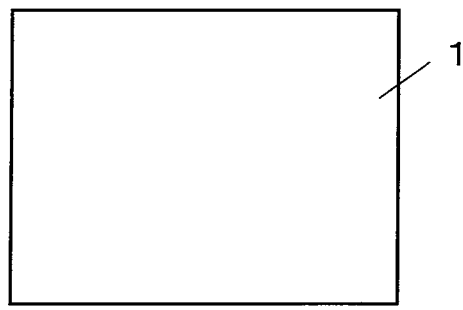
FIG. 3 is a front view of a substrate, showing an instrument dial manufacturing method (manufacturing process) according to the embodiment.
Figure 4:
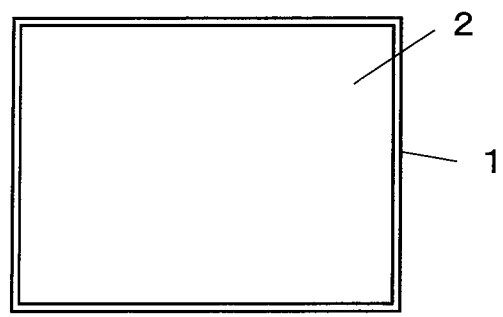
FIG. 4, showing the instrument dial manufacturing method (manufacturing process) according to the embodiment, is a front view of an underlying portion when it is formed on the substrate.
Figure 5:
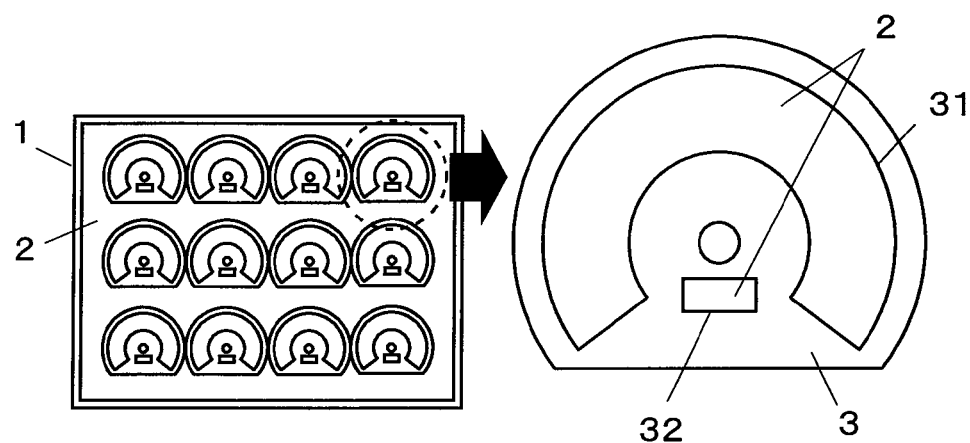
FIG. 5, showing the instrument dial manufacturing method (manufacturing process) according to the embodiment, is a front view of a first background portion when it is formed on the substrate.
Figure 6:
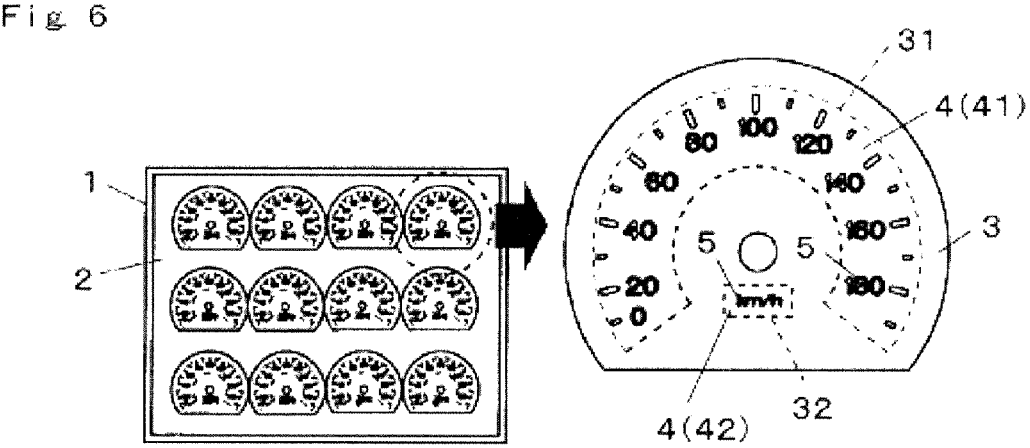
FIG. 6, showing the instrument dial manufacturing method (manufacturing process) according to the embodiment, is a front view of second background portions when they are formed on the substrate.
Figure 7:
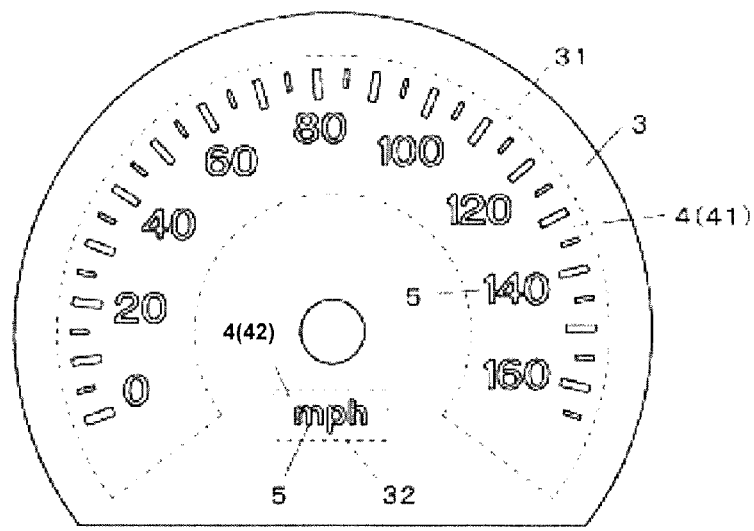
FIG. 7 is a front view of an instrument dial whose variation differs in the embodiment.

FIGS. 1 to 7 show one embodiment of an instrument dial and its manufacturing method according to the invention. FIGS. 1 and 2 showing a use condition of the instrument dial, FIG. 1 is a sectional view of the instrument dial, and FIG. 2 a front view of the instrument dial. Also, FIGS. 3 to 6 showing a method (a process) of manufacturing the instrument dial, FIG. 3 is a front view of a substrate, FIG. 4 shows a front view when an underlying portion is formed on the substrate, FIG. 5 shows a front view when a first background portion is formed on the substrate, and FIG. 6 shows a front view when second background portions are formed on the substrate. Also, FIG. 7 is a front view of an instrument dial whose basic configuration is the same as that of the instrument dial described in FIGS. 1 and 2, but whose variation differs from that thereof in that index portions have a differing design.

In FIGS. 1 and 2, the instrument dial according to the embodiment includes a substrate 1, an underlying portion 2, a first background portion 3, second background portions 4, and index portions 5. In FIG. 2, an instrument mechanism configured of a pointer, which indicates the index portions 5, and a drive device, which rotates the pointer in accordance with a measured quantity, is shown by the alternate long and short dash line.

The substrate 1 is configured of a translucent synthetic resin substrate of, for example, PC (polycarbonate) or PMMA (a methacrylate resin).

The underlying portion 2 is configured of a print layer obtained by screen (silk) printing, for example, a white translucent ink on the substrate 1, in which case the underlying portion 2 is uniformly printed all over in such a way as to cover the whole region of the substrate 1. In the embodiment, the underlying portion 2 is made of a single colored single layer, but may also be made of multicolored (multilayered). Also, the color and property of the underlying portion 2 are optional.

The first background portion 3 is configured of a print layer obtained by screen (silk) printing an ink of a color or brightness differing from that of the underlying portion 2, for example, a black, opaque ink, on the underlying portion 2, in which case the first background portion 3 does not include design elements (the index portions) such as calibrations, numbers, letters, and marks. Then, the first background portion 3, being smaller in formation area than the underlying portion 2, is formed so as to have a first non-formation region 31 through which the underlying portion 2 is exposed in a shape corresponding to a first background region, to be described hereafter, of the second background portions 4, and a second non-formation region 32 through which the underlying portion 2 is exposed in a shape corresponding to a second background region, to be described hereafter, of the second background portions 4 (refer to FIGS. 1 and 5).

The second background portions 4, being configured of a digital print layer formed by using an inkjet method to print, for example, an ultraviolet cure ink on the underlying regions of the underlying portion 2 positioned in each of the first and second non-formation regions 31 and 32, are configured of a first background region 41, which includes the index portions 5 formed of calibrations and numbers corresponding to vehicle speed values indicated by the pointer, and a second background region 42 which includes the index portion 5 configured of letters "km/h" indicating a vehicle speed unit.

Then, in this case, each index portion 5, as well as having the same color or the same kind of brightness as the underlying portion 2, is formed as an index portion 5 having translucency, and both the first and second background regions 41 and 42, which are the regions backgrounding the index portions 5, are formed as opaque backgrounds in black which is the same color as that of the first background portion 3. The regions forming the backgrounds may also be printed a plurality of times in order to improve the light blocking effect thereof. Also, the second background portions 4 can be set to an optional color, but it is possible to obscure the boundaries between the backgrounds 3 and 4 by setting them to the same color as that of the first background portion 3.

Next, a description will be given, based on FIGS. 3 to 6, of the instrument dial manufacturing method according to the embodiment.

The substrate 1 of a predetermined size is prepared. In the embodiment, the substrate 1 is used which is of a size such that 12 instrument dials can eventually be made in a series of manufacturing steps.

Next, the underlying portion 2 is screen printed on a surface of the substrate 1 (a first screen printing step). In this case, the underlying portion 2 is uniformly printed to cover approximately the whole region of the substrate 1.

Next, the first background portion 3 is printed on a surface of the underlying portion 2 (a second screen printing step). In this case, the first background portion 3 is formed in such a way as to form the first and second non-formation regions 31 and 32.

Next, the second background portions 4 (first and second background regions 41 and 42) are digitally printed using the inkjet method in such a way as to cover the first and second non-formation regions 31 and 32 through which the underlying portion 2 is exposed (a digital printing step). As a digital print technology using the inkjet method itself is described, for example, in JP-A-2006-214906, a detailed description is omitted but, although an electrophotographic method or thermal transfer method may also be used as a digital print technique using other than the inkjet method, particularly, an ink-jet print using an ultraviolet cure ink enhances an ink adhesion, and enables a high definition print, meaning that it is possible to improve merchantability.

Next, the substrate 1 printed as above is cut into individual instrument dial units, thereby completing the instrument dial described in FIG. 1.

The above is the process of manufacturing the instrument dial having the numbers, calibrations, and vehicle speed unit of "km/h" as the index portions 5.

FIG. 7 showing an instrument dial having numbers, calibrations, and a vehicle speed unit, which are in "mph", as the index portions 5, the instrument dial is of the same basic configuration as the instrument dial of FIG. 1, but differs in variation (for example, destination) therefrom in that the design of the index portions 5 corresponds to the vehicle speed unit "mph", rather than the vehicle speed unit "km/h".

That is, between the instrument dial of FIG. 1 and the instrument dial of FIG. 7, the print design of the second background portions 4 configured of a digital print layer only differs according to the vehicle speed unit ("km/h", "mph"), and the series of manufacturing (printing) steps, the shape of the screen print layer configured of the substrate 1, underlying layer 2, and first background layer 3 (for which a common block is used), and the external shape of the digital print layer, are common.

As heretofore described, in the embodiment, an instrument dial with index portions 5 provided in background portions 3 and 4 by subjecting a substrate 1 to printing includes an underlying portion 2 configured of a screen print layer provided on the substrate 1; a first background portion 3 which, being configured of a screen print layer formed on the underlying portion 2, does not include the index portions 5; and second background portions 4 which are configured of a digital print layer formed on the underlying portion 2 and, as well as including the index portions 5, are continuous with the first background portion 3, whereby the first background portions 3 and underlying portion 2 which have no design elements, such as the index portions 5, can share a block, and the second background portions 4 which include a variety of design elements in accordance with a variation development, or the like, can eliminate the need for a block, thereby shortening a print time and simplifying the manufacturing process, meaning that it is possible to achieve a reduction in cost. The underlying layer 2 may also be omitted as necessary.

Also, in the embodiment, the underlying portion 2 is formed on the substrate 1 so as to have a wider range than the first background portion 3 and second background portions 4, the first background portion 3 has non-formation regions 31 and 32 through which the underlying portion 2 is exposed in shapes corresponding to the second background portions 4, and the second background portions 4 are provided on portions of the underlying portion 2 positioned in the non-formation regions 41 and 42, whereby there is no need to provide a dedicated underlying layer even in the event that the second background portions 4 need an underlying layer, meaning that it is possible to achieve a further reduction in cost.

Also, in the embodiment, the digital print layer is configured of an ultraviolet cure ink-jet print layer, thereby enhancing an ink adhesion, and enabling a high definition print, meaning that it is possible to improve merchantability.

Also, in the embodiment, a method of manufacturing an instrument dial with index portions 5 provided in background portions 3 and 4 by subjecting a substrate 1 to printing includes a first screen printing step which forms an underlying portion 2 on the substrate 1; a second screen printing step which forms on the underlying portion 2 a first background portion 3 which does not include the index portions 5; and a digital printing step which forms, on the underlying portion 2, second background portions 4 which, as well as including the index portions 5, are continuous with the first background portion 3, and the instrument dial is manufactured using the steps, whereby the first background portion 3 and underlying portion 2 which have no design elements, such as the index portions 5, can share a block, and the second background portions 4 which include a variety of design elements in accordance with a variation development, or the like, can eliminate the need for a block, thereby shortening the print time and simplifying the manufacturing process, meaning that it is possible to achieve a reduction in cost. The second printing step which forms the underlying layer 3 may also be omitted as necessary.

Also, in the embodiment, the underlying portion 2 is formed so as to have a wider range than the first background portion 3 and second background portions 4, the first background portion 3 is formed in such a way as to have non-formation regions 31 and 32 through which the underlying portion 2 is exposed in shapes corresponding to the second background portions 4, and the second background portions 4 are provided in such a way as to cover portions of the underlying portion 2 positioned in the non-formation regions 41 and 42, whereby there is no need to provide a dedicated underlying layer even in the event that the second background portions 4 need an underlying layer, meaning that it is possible to achieve a further reduction in cost.

In the embodiment, a description has been given, as an example, of instrument dials whose index portion 5 designs differ from one another due to the vehicle speed units, but the invention may be applied in accordance with variations of, for example, a design element relating to a pointer rotation position (range) in a red zone display portion, or the like, and a design element relating to each warning and alarm mark, or the like.

INDUSTRIAL APPLICABILITY

The invention can be applied to an instrument dial mounted not only on a vehicle, but on a vessel, and to a method of manufacturing the instrument dial.

The invention claimed is:

1. An instrument dial with index portions provided in background portions by subjecting a substrate to printing, characterized by including:
   an underlying portion configured of a screen print layer provided on the substrate;
   a first background portion which, being configured of a screen print layer formed on the underlying portion, does not include the index portions; and
   a second background portion which is configured of a digital print layer formed on the underlying portion and, as well as including the index portions, is continuous with the first background portion,
   wherein the underlying portion is formed on the substrate so as to have a wider range than the first background portion and second background portion, the first background portion has non-formation regions through which the underlying portion is exposed in shapes corresponding to the second background portions, and the second background portion is provided on portions of the underlying portion positioned in the non-formation region.

2. A method of manufacturing an instrument dial with index portions provided in background portions by subjecting a substrate to printing, characterized by including;

a first screen printing step which forms an underlying portion on the substrate;

a second screen printing step which forms on the underlying portion a first background portion which does not include the index portions; and a digital printing step which forms, on the underlying portion, second background portion which, as well as including the index portions, is continuous with the first background portion, wherein the underlying portion is formed so as to have a wider range than the first background portion and second background portion, and the first background portion is formed in such a way as to have non-formation region through which the underlying portion is exposed in shapes corresponding to the second background portion, and the second background portion is provided in such a way as to cover the underlying portion positioned in the non-formation region.

\* \* \* \* \*